(12) United States Patent
Lee (10) Patent No.: US 10,764,084 B2
(45) Date of Patent: Sep. 1, 2020

(54) INTEGRATED ELECTRONIC CONTROL UNIT

(71) Applicant: MANDO CORPORATION, Gyeonggi-do (KR)

(72) Inventor: Hyun Chul Lee, Gyeonggi-do (KR)

(73) Assignee: MANDO CORPORATION, Gyeonggi-Do (KR)

( * ) Notice: Subject to any disclaimer, the term of this patent is extended or adjusted under 35 U.S.C. 154(b) by 60 days.

(21) Appl. No.: 16/125,577

(22) Filed: Sep. 7, 2018

(65) Prior Publication Data

US 2019/0081816 A1    Mar. 14, 2019

(30) Foreign Application Priority Data

Sep. 11, 2017  (KR) .................. 10-2017-0116026

(51) Int. Cl.
*H04L 12/40* (2006.01)
*B60R 16/03* (2006.01)
*B60R 16/023* (2006.01)

(52) U.S. Cl.
CPC ...... *H04L 12/4013* (2013.01); *B60R 16/0315* (2013.01); *B60R 16/0231* (2013.01); *H04L 2012/40215* (2013.01); *H04L 2012/40273* (2013.01)

(58) Field of Classification Search
CPC ....... H04L 12/4013; H04L 2012/40215; H04L 2012/40273; H04L 67/12; H04L 12/66; H04L 63/1425; H04L 12/40013; H04L 12/40019; B60R 16/0315; B60R 16/0231; B60W 50/00; H04W 88/16
See application file for complete search history.

(56) References Cited

U.S. PATENT DOCUMENTS

| 2002/0099487 A1* | 7/2002 | Suganuma | B60R 16/0232 701/48 |
| 2004/0083043 A1* | 4/2004 | Akiyama | B60G 17/0195 701/48 |
| 2009/0076682 A1* | 3/2009 | Ghoneim | B60W 40/08 701/36 |
| 2014/0288776 A1* | 9/2014 | Anderson | B60G 17/016 701/37 |
| 2017/0270068 A1* | 9/2017 | Wakita | G06F 11/0739 |

(Continued)

FOREIGN PATENT DOCUMENTS

KR    10-1706415    2/2017

*Primary Examiner* — Paul H Masur
*Assistant Examiner* — Michael K Phillips
(74) *Attorney, Agent, or Firm* — Ladas & Parry, LLP (57) ABSTRACT

Provided is an integrated ECU. The integrated ECU includes an integrated electronic control unit (ECU) including: a gateway configured to perform a network communication in connection with a network; a vehicle motion main controller having a domain corresponding to first sensing information sensed by a vehicle motion sensor of the sensor such that the vehicle motion main controller performs control on a motion of a vehicle by receiving the first sensing information using the gateway; and a vehicle safety main controller having a domain corresponding to second sensing information sensed by a vehicle safety sensor such that the vehicle safety main controller performs control on a safety of the vehicle by receiving the second sensing information using the gateway.

18 Claims, 4 Drawing Sheets

(56) References Cited

U.S. PATENT DOCUMENTS

| | | | |
|---|---|---|---|
| 2018/0176305 A1* | 6/2018 | Omori | B60W 50/00 |
| 2018/0212822 A1* | 7/2018 | Ikeda | G06F 8/654 |
| 2018/0308293 A1* | 10/2018 | DeCia | H04N 7/181 |
| 2019/0014290 A1* | 1/2019 | Dellantoni | G01C 21/3602 |
| 2019/0279374 A1* | 9/2019 | Kim | B60W 40/105 |

\* cited by examiner

FIG. 4

INTEGRATED ELECTRONIC CONTROL UNIT

CROSS-REFERENCE TO RELATED APPLICATION

This application is based on and claims priority under 35 U.S.C. § 119 to Korean Patent Application No. 2017-0116026, filed on Sep. 11, 2017 in the Korean Intellectual Property Office, the disclosure of which is incorporated herein by reference.

BACKGROUND

1. Field

The present disclosure relates to an integrated electronic control unit (ECU).

2. Description of the Related Art

Conventionally, an electronic control unit (ECU) is a main computer used for a vehicle, configured to receive pieces of sensing information from sensors mounted on the vehicle and control the overall operation of the vehicle.

For example, Korean Registered Patent No. 10-1706415 (Feb. 7, 2017) discloses a detachable controller for a vehicle that may perform control on the basis of a sensing signal received from a sensor and an image signal received from a camera using a main controller and a plurality of sub-control modules.

However, the conventional detachable controller for a vehicle has a limitation in rapidly processing signals related to each piece of sensing information, thus having difficulty in improving the signal processing rate and the response characteristics.

RELATED ART DOCUMENT

Korean Registered Patent No. 10-1706415 (Feb. 7, 2017)

SUMMARY

Therefore, it is an object of the present disclosure to provide an integrated ECU capable of improving the response characteristics while improving the signal processing rate.

Additional aspects of the invention will be set forth in part in the description which follows and, in part, will be obvious from the description, or may be learned by practice of the disclosure.

Therefore, it is an aspect of the present disclosure to provide an integrated electronic control unit (ECU) including: a gateway configured to perform a network communication in connection with a network; a vehicle motion main controller having a domain corresponding to first sensing information sensed by a vehicle motion sensor of a vehicle such that the vehicle motion main controller performs control on a motion of the vehicle by receiving the first sensing information using the gateway; and a vehicle safety main controller having a domain corresponding to second sensing information sensed by a vehicle safety sensor of the vehicle such that the vehicle safety main controller performs control on a safety of the vehicle by receiving the second sensing information using the gateway.

The integrated ECU may further include a vehicle driving main controller having a domain corresponding to third sensing information sensed by a vehicle driving sensor of the vehicle such that the vehicle driving main controller performs control on a driving of the vehicle by receiving the third sensing information using the gateway.

The integrated ECU may further include a vehicle motion sub-controller connected to the vehicle motion main controller, and configured to perform control on the first sensing information desired to be controlled by the vehicle motion main controller in cooperation with the vehicle motion main controller.

The integrated ECU may further include a vehicle safety sub-controller connected to the vehicle safety main controller, and configured to perform control on the second sensing information desired to be controlled by the vehicle safety main controller in cooperation with the vehicle safety main controller.

Upon determining that a network traffic occurs in the vehicle motion main controller, the vehicle motion sub-controller may be configured to perform control on the first sensing information desired to be controlled by the vehicle motion main controller in cooperation with the vehicle motion main controller by receiving a first cooperative control signal from the vehicle motion main controller.

Upon determining that a network traffic occurs in the vehicle motion main controller, the vehicle motion sub-controller may be configured to perform control on a piece of the first sensing information that causes an excessive load of the network traffic among pieces of the first sensing information in cooperation with the vehicle motion main controller by receiving a first cooperative control signal corresponding to the piece of the first sensing information causing the excessive load of the network traffic from the vehicle motion main controller.

Upon determining that a network traffic occurs in the vehicle safety main controller, the vehicle safety sub-controller may be configured to perform control on the second sensing information desired to be controlled by the vehicle safety main controller in cooperation with the vehicle safety main controller by receiving a second cooperative control signal from the vehicle safety main controller.

Upon determining that a network traffic occurs in the vehicle safety main controller, the vehicle safety sub-controller may be configured to perform control on a piece of the second sensing information that causes an excessive load of the network traffic among pieces of the second sensing information in cooperation with the vehicle safety main controller by receiving a second cooperative control signal corresponding to the piece of the second sensing information causing the excessive load of the network traffic from the vehicle safety main controller.

The integrated may further include a vehicle driving sub-controller connected to the vehicle driving main controller, and configured to perform control on the third sensing information desired to be controlled by the vehicle driving main controller in cooperation with the vehicle driving main controller.

Upon determining that a network traffic occurs in the vehicle driving main controller, the vehicle driving sub-controller may be configured to perform control on the third sensing information desired to be controlled by the vehicle driving main controller in cooperation with the vehicle driving main controller by receiving a third cooperative control signal from the vehicle driving main controller.

Upon determining that a network traffic occurs in the vehicle driving main controller, the vehicle driving sub-controller may be configured to perform control on a piece of the third sensing information that causes an excessive load of the network traffic among pieces of the third sensing information in cooperation with the vehicle driving main controller by receiving a third cooperative control signal corresponding to the piece of the third sensing information causing the excessive load of the network traffic from the vehicle driving main controller.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Hereinafter, embodiments of the present disclosure will be described in detail with reference to the accompanying drawings. The following embodiments are provided to fully convey the spirit of the present disclosure to a person having ordinary skill in the art to which the present disclosure belongs. The present disclosure is not limited to the embodiments shown herein but may be embodied in other forms. In order to make the description of the present disclosure clear, unrelated parts are not shown and, the sizes of components are exaggerated for clarity.

Figure 1:
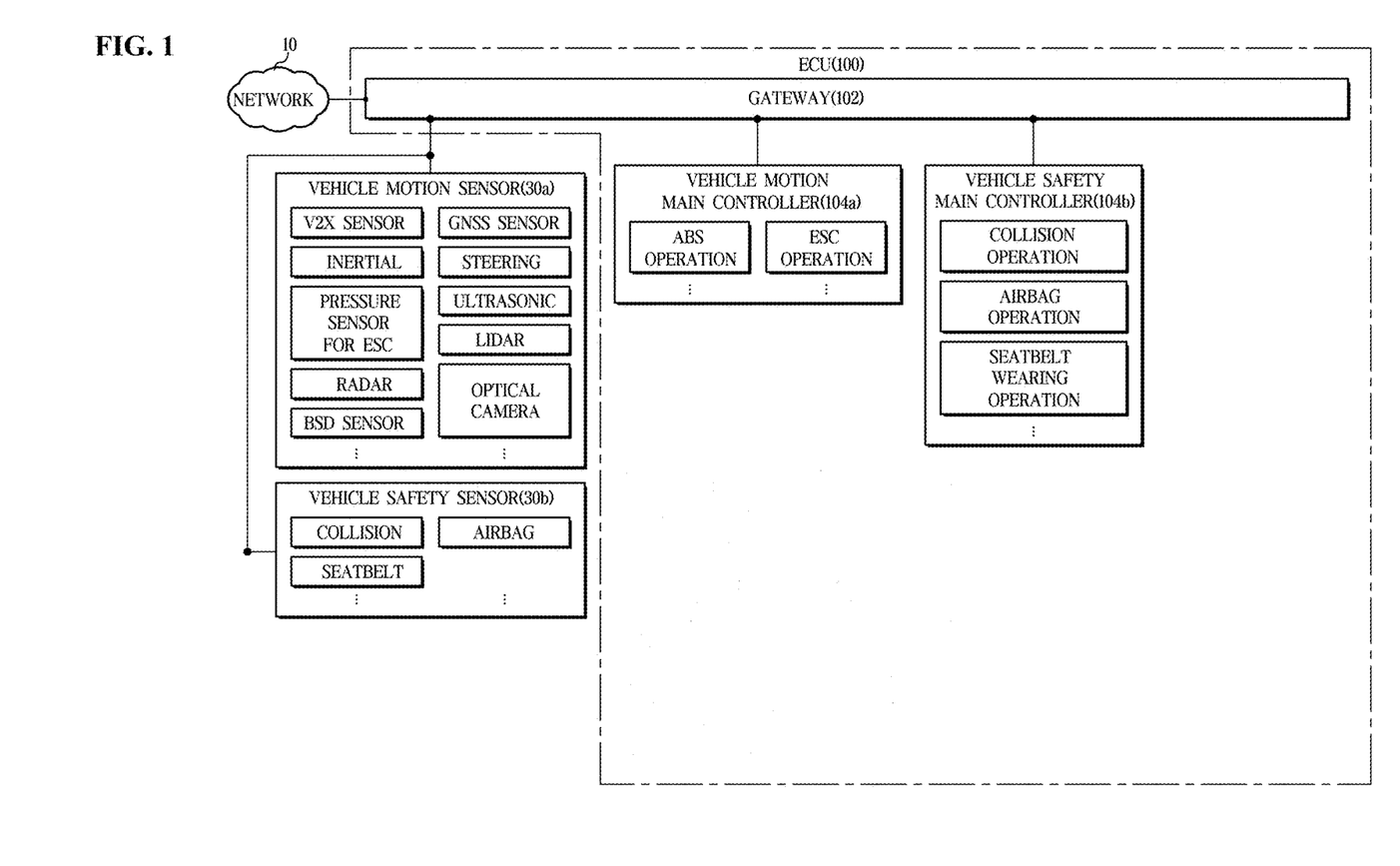
FIG. 1 is a block diagram illustrating an example of an integrated ECU according to an embodiment of the present disclosure.
Figure 2:
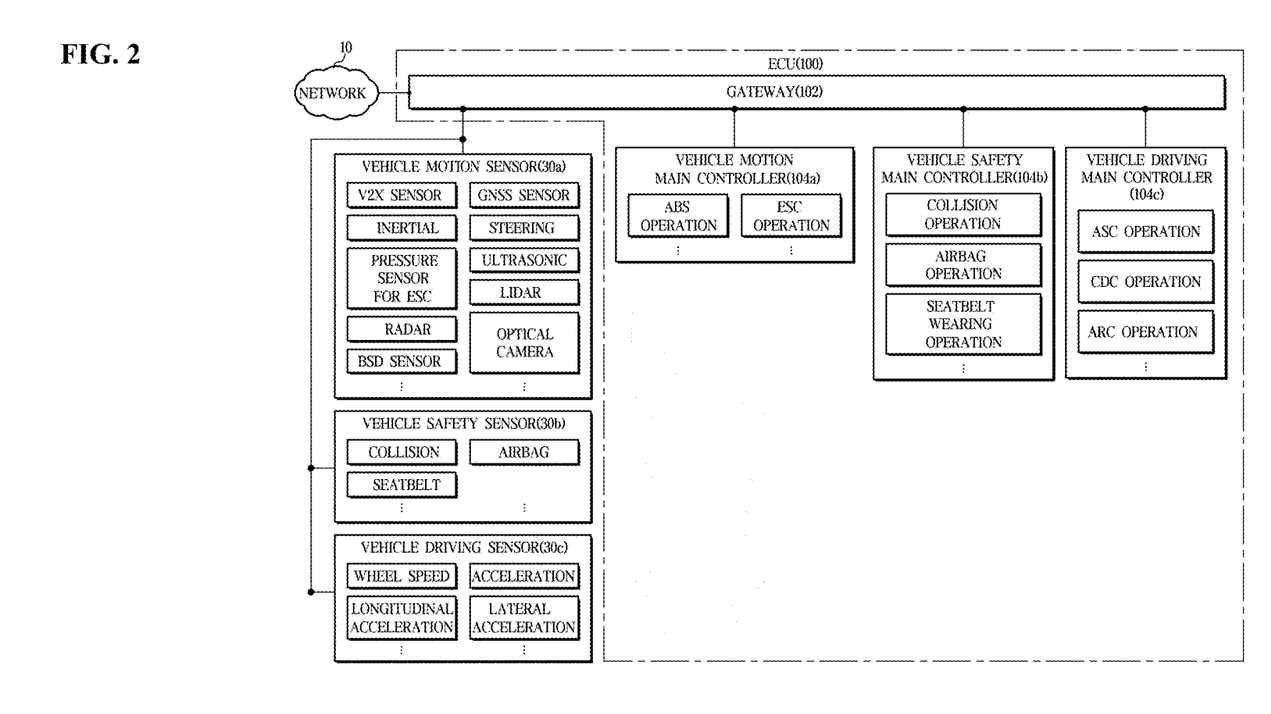
FIG. 2 is a block diagram illustrating another example of an integrated ECU according to an embodiment of the present disclosure.

FIG. 1 is a block diagram illustrating an example of an integrated ECU according to an embodiment of the present disclosure, and FIG. 2 is a block diagram illustrating another example of an integrated ECU according to an embodiment of the present disclosure.

Figure 3:
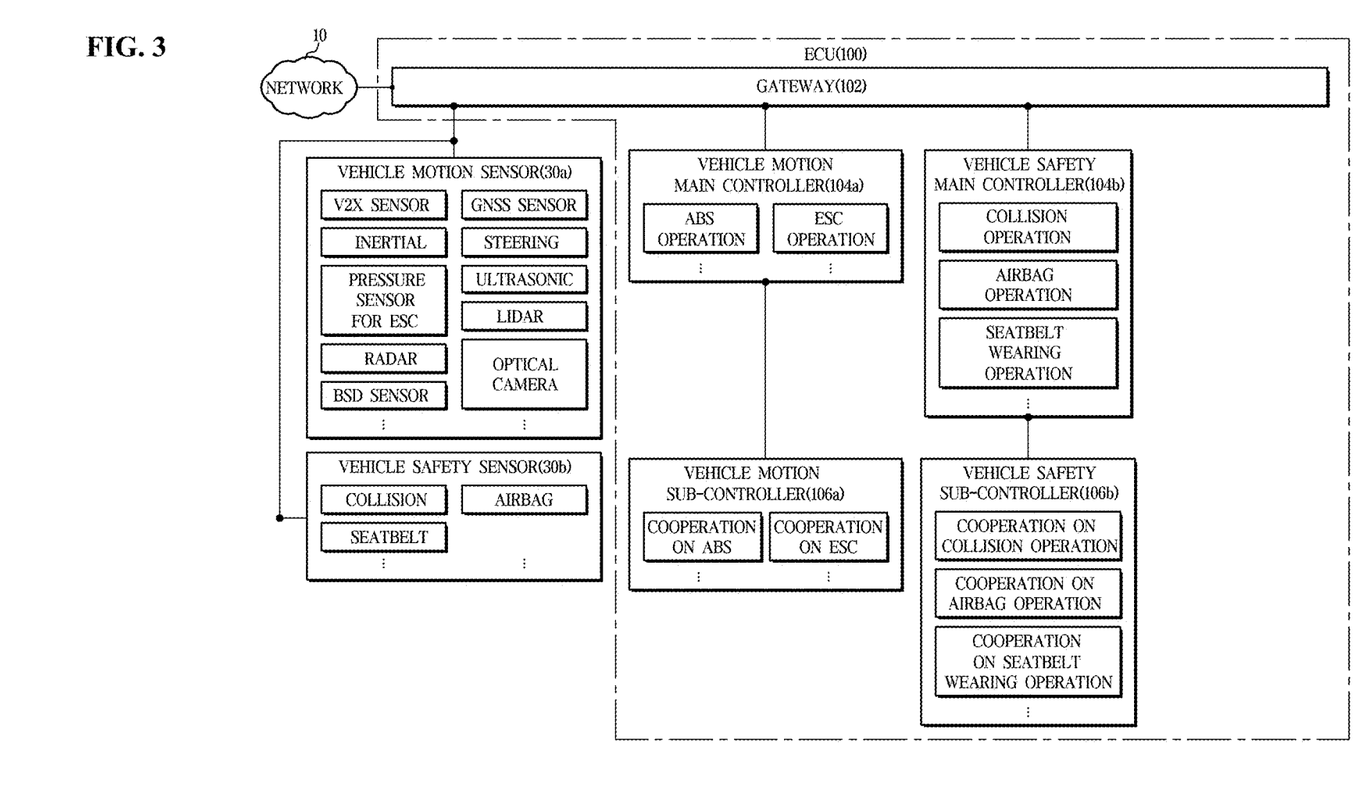
FIG. 3 is a block diagram illustrating another example of an integrated ECU according to an embodiment of the present disclosure.
Figure 4:
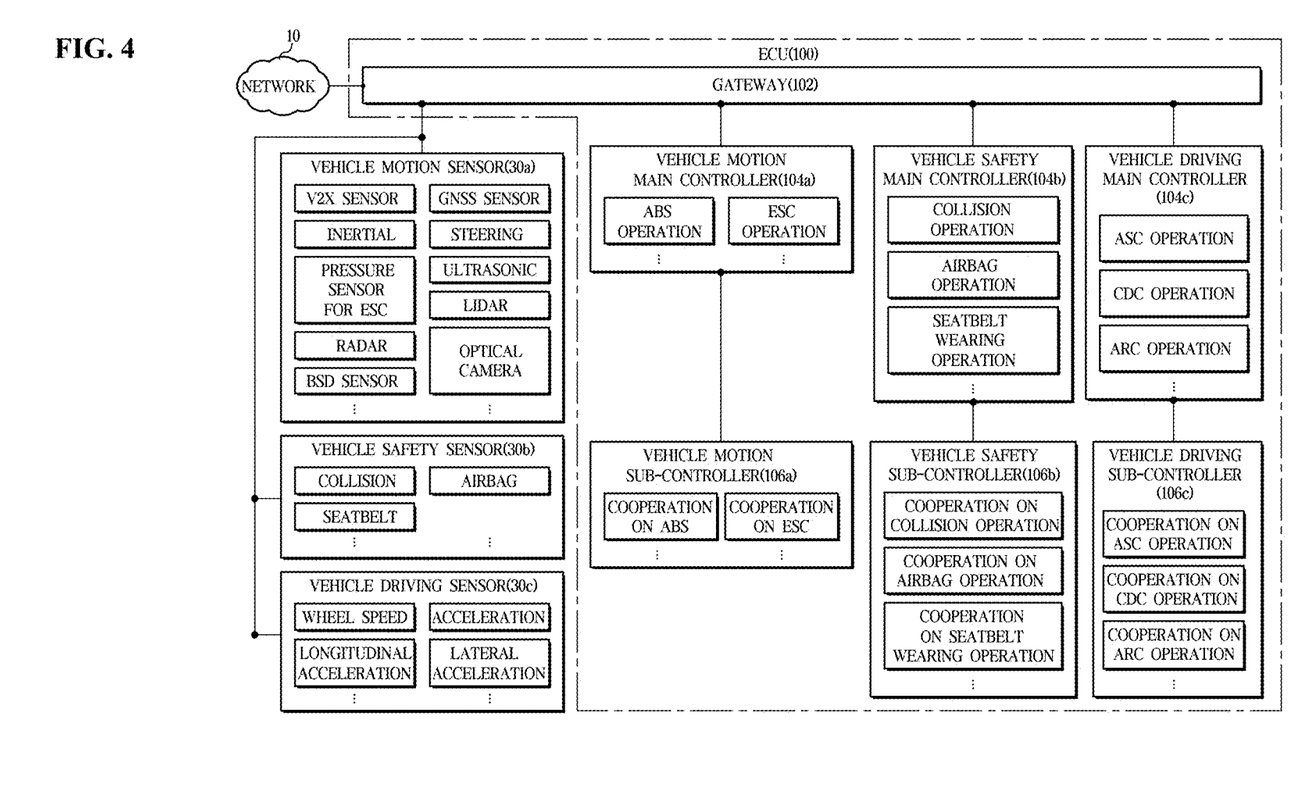
FIG. 4 is a block diagram illustrating another example of an integrated ECU according to an embodiment of the present disclosure.

FIG. 3 is a block diagram illustrating another example of an integrated ECU according to an embodiment of the present disclosure, and FIG. 4 is a block diagram illustrating another example of an integrated ECU according to an embodiment of the present disclosure.

Referring to FIGS. 1 to 4, an integrated ECU 100 according to an embodiment of the present disclosure includes a gateway 102, a vehicle motion main controller 104a, and a vehicle safety main controller 104b.

The gateway 102 is connected to a network 10 to perform a network communication.

Here, the network 10 may be an Ethernet network, and the network communication may be a controller area network (CAN) communication.

The vehicle motion main controller 104a has a domain corresponding to first sensing information sensed by a vehicle motion sensor 30a such that the vehicle motion main controller 104a performs control on a motion of a vehicle by receiving the first sensing information using the gateway 102.

The vehicle safety main controller 104b has a domain corresponding to second sensing information sensed by a vehicle safety sensor 30b such that the vehicle safety main controller 104b performs control on a safety of the vehicle by receiving the second sensing information using the gateway 102.

For example, the vehicle motion sensor 30a may include at least one of a Vehicle to everything (V2X) sensor, a Global Navigation Satellite System (GNSS) sensor, an inertial sensor, a steering sensor, a pressure sensor for Electronic Stability Control (ESC), an ultrasonic sensor, a radar sensor, a light detection and ranging (LiDAR) sensor, a blind spot detection (BSD) sensor, and an optical camera sensor.

Here, the optical camera sensor may include at least one of a Complementary Metal Oxide Semiconductor (CMOS) image sensor and a Charge Coupled Device (CCD) image sensor.

At this time, the vehicle motion main controller 104a may receive first sensing information sensed by at least one of the V2X sensor, the GNSS sensor, and the inertial sensor, and may control the motion of the vehicle including at least one of an Anti-lock Brake System (ABS) operation and an Electronic Stability Control (ESC) operation.

In addition, the vehicle motion main controller 104a may receive first sensing information sensed by at least one of the steering sensor, the pressure sensor for ESC, the ultrasonic sensor, the radar sensor, the LiDAR sensor, the BSD sensor, and the optical camera sensor, and may perform control on the motion of the vehicle including at least one of an ABS operation and ESC operation.

For example, the vehicle safety sensor 30b may include at least one of a collision sensor, an airbag sensor, and a seatbelt sensor, and the vehicle safety main controller 104b may receive second sensing information sensed by at least one of the collision sensor, the airbag sensor, and the seatbelt sensor, and may control the safety of the vehicle including at least one of a collision operation, an airbag operation, and a seatbelt wearing operation of the vehicle.

Referring to FIGS. 2 and 4, the integrated ECU 100 according to the embodiment of the present disclosure may further include a vehicle driving main controller 104c.

The vehicle driving main controller 104c may have a domain corresponding to third sensing information sensed by a vehicle driving sensor 30c such that the vehicle driving main controller 104c performs control on a driving of the vehicle by receiving the third sensing information using the gateway.

For example, the vehicle driving sensor 30c may include at least one of a wheel speed sensor, a wheel acceleration sensor, a longitudinal acceleration sensor, and a lateral acceleration sensor, and the vehicle driving main controller 104c may receive third sensing information sensed by at least one of the wheel speed sensor, the wheel acceleration sensor, the longitudinal acceleration sensor, and the lateral acceleration sensor, and may control the driving of the vehicle including at least one of an Air Suspension Control (ASC) operation, a Continuous Damping Control (CDC) operation, and an Active Roll Control (ARC) operation.

Referring to FIGS. 3 and 4, the integrated ECU 100 according to the embodiment of the present disclosure may further include a vehicle motion sub-controller 106a and a vehicle safety sub-controller 106b.

The vehicle motion sub-controller 106a is connected to the vehicle motion main controller 104a, and configured to perform control on the first sensing information desired to be controlled by the vehicle motion main controller 104a in cooperation with the vehicle motion main controller 104a.

For example, the vehicle motion sub-controller 106a may receive first sensing information desired to be controlled by the vehicle motion main controller 104a and sensed by at least one of the V2X sensor, the GNSS sensor, and the inertial sensor, and may control the motion of the vehicle including at least one of an ABS operation and an ESC operation in cooperation with the vehicle motion main controller 104a.

In other words, the vehicle motion main controller 104a may receive first sensing information sensed by at least one of the V2X sensor, the GNSS sensor, and the inertial sensor and may control at least one of the ABS operation and the ESC operation, and the vehicle motion sub-controller 106a may control at least one of the ABS operation and the ESC operation that has a slow response speed when the vehicle motion main controller 104a controls at least one of the ABS operation and the ESC operation.

In addition, the vehicle motion main controller 104a may receive first sensing information sensed by at least one of the steering sensor, the pressure sensor for ESC, the ultrasonic sensor, the radar sensor, the LiDAR sensor, the BSD sensor, and the optical camera sensor and may control at least one of an ABS operation and ESC operation, and the vehicle motion sub-controller 106a may control at least one of the ABS operation and the ESC operation that has a slow response speed when the vehicle motion main controller 104a controls at last one of the ABS operation and the ESC operation.

The vehicle safety sub-controller 106b may be connected to the vehicle safety main controller 104b, and perform control on second sensing information desired to be controlled by the vehicle safety main controller 104b in cooperation with the vehicle safety main controller 104b.

For example, the vehicle safety sub-controller 106b may receive second sensing information desired to be controlled by the vehicle safety main controller 104b and sensed by at least one of the collision sensor, the airbag sensor, and the seatbelt sensor, and may control the safety of the vehicle including at least one of a collision operation, an air bag operation, and a seat belt wearing operation of the vehicle in cooperation with the vehicle safety main controller 104b.

In other words, the vehicle safety main controller 104b may receive second sensing information sensed by at least one of the collision sensor, the air bag sensor, and the seat belt sensor and may control at least one of a collision operation, an airbag operation, and a seat belt wearing operation of the vehicle, and the vehicle safety sub-controller 106b may control at least one of the collision operation, the airbag operation, and the seat belt wearing operation of the vehicle that has a slow response speed when the vehicle safety main controller 104b controls at least one of the collision operation, the airbag operation, and the seat belt wearing operation of the vehicle.

Referring to FIG. 4, the integrated ECU 10 may further include a vehicle driving sub-controller 106c.

The vehicle driving sub-controller 106c may be connected to the vehicle driving main controller 104c and perform control on third sensing information desired to be controlled by the vehicle driving main controller 104c in cooperation with the vehicle driving main controller 104c.

For example, the vehicle driving sub-controller 106c may receive third sensing information desired to be controlled by the vehicle driving main controller 104c and sensed by at least one of the wheel speed sensor, the wheel acceleration sensor, the longitudinal acceleration sensor, and the lateral acceleration sensor and may control the driving of the vehicle including at least one of an ASC operation, a CDC operation, and an ARC operation in cooperation with the vehicle driving main controller 104c.

In other words, the vehicle driving main controller 104c may receive third sensing information sensed by at least one of the wheel speed sensor, the wheel acceleration sensor, the longitudinal acceleration sensor, and the lateral acceleration sensor and may control at least one of the ASC operation, the CDC operation, and the ARC operation, and the vehicle driving sub-controller 106c may control at least one of the ASC operation, the CDC operation, and the ARC operation that has a slow response speed when the vehicle driving main controller 104c controls the at least one of the ASC operation, the CDC operation, and the ARC operation.

Referring to FIGS. 3 and 4, the vehicle motion sub-controller 106a of the integrated ECU 100 according to the embodiment of the present disclosure may be configured to, upon determining that a network traffic occurs in the vehicle motion main controller 104a, perform control on the first sensing information desired to be controlled by the vehicle motion main controller 104a in cooperation with the vehicle motion main controller 104a by receiving a first cooperative control signal from the vehicle motion main controller 104a.

For example, the vehicle motion sub-controller 106a may be configured to, upon determining that a network traffic occurs in the vehicle motion main controller 104a, perform control on at least one of an ABS operation and an ESC operation regarding the first sensing information desired to be controlled by the vehicle motion main controller 104a in cooperation with the vehicle motion main controller 104a, by receiving a first cooperative control signal from the vehicle motion main controller 104a.

In other words, the vehicle motion main controller 104a may receive first sensing information sensed by at least one of the V2X sensor, the GNSS sensor, and the inertial sensor and may control at least one of the ABS operation and the ESC operation, and the vehicle motion sub-controller 106a, upon determining that a network traffic occurs in the vehicle motion main controller 104a, control at least one of the ABS operation and the ESC operation desired to be controlled by the vehicle motion main controller 104a.

Referring to FIGS. 3 and 4, the vehicle safety sub-controller 106b of the integrated ECU 100 according to the embodiment of the present disclosure may be configured to, upon determining that a network traffic occurs in the vehicle safety main controller 104b, perform control on the second sensing information desired to be controlled by the vehicle safety main controller 104b in cooperation with the vehicle safety main controller 104b by receiving a second cooperative control signal from the vehicle safety main controller 104b.

For example, upon determining that a network traffic occurs in the vehicle safety main controller 104b, the vehicle safety sub-controller 106b may control at least one of a collision operation, an air bag operation, and a seatbelt wearing operation of the vehicle regarding the second sensing information desired to be controlled by the vehicle safety main controller 104b in cooperation with the vehicle safety main controller 104b, by receiving a second cooperative control signal from the vehicle safety main controller 104b.

In other words, the vehicle safety main controller 104b may receive second sensing information sensed by at least one of the collision sensor, the air bag sensor, and the seat belt sensor and may control at least one of the collision operation, the airbag operation, and the seat belt wearing operation of the vehicle, and the vehicle safety sub-controller 106b, upon determining that a network traffic occurs in the vehicle safety main controller 104b, may control at least one of the collision operation, the airbag operation, and the seat belt wearing operation of the vehicle desired to be controller by the vehicle safety main controller 104b.

Referring to FIG. 4, the vehicle driving sub-controller 106c of the integrated ECU 100 according to the embodiment of the present disclosure may be configured to, upon determining that a network traffic occurs in the vehicle driving main controller 104c, perform control on the third sensing information desired to be controlled by the vehicle driving main controller 104c in cooperation with the vehicle driving main controller 104c by receiving a third cooperative control signal from the vehicle driving main controller 104c.

For example, upon determining that a network traffic occurs in the vehicle driving main controller 104c, the vehicle driving sub-controller 106c controls at least one of an ASC operation, a CDC operation, and an ARC operation regarding the third sensing information desired to be controlled by the vehicle driving main controller 104c in cooperation with the vehicle driving main controller 104c by receiving a third cooperative control signal from the vehicle driving main controller 104c.

In other words, the vehicle driving main controller 104c may receive third sensing information sensed by at least one of the wheel speed sensor, the wheel acceleration sensor, the longitudinal acceleration sensor, and the lateral acceleration sensor and may control at least one of the ASC operation, the CDC operation, and the ARC operation, and the vehicle driving sub-controller 106c, upon determining that a network traffic occurs in the vehicle driving main controller 104c, may control at least one of the ASC operation, the CDC operation, and the ARC operation desired to be controlled by the vehicle driving main controller 104c.

Referring to FIGS. 3 and 4, the vehicle motion sub-controller 106a of the integrated ECU 100 according to the embodiment of the present disclosure may be configured to, upon determining that a network traffic occurs in the vehicle motion main controller 104a, perform control on a piece of the first sensing information that causes an excessive load of the network traffic among pieces of the first sensing information in cooperation with the vehicle motion main controller 104a by receiving a first cooperative control signal corresponding to the piece of the first sensing information causing the excessive load of the network traffic from the vehicle motion main controller 104a.

For example, the vehicle motion sub-controller 106a, upon determining that a network traffic occurs in the vehicle motion main controller 104a, may receive a first cooperative control signal corresponding to a piece of first sensing information that causes an excessive load of the network traffic, among pieces of first sensing information from the vehicle motion main controller 104a, and may control at least one of an ABS operation and an ESC operation regarding the piece of first sensing information that causes the excessive load of the network traffic in cooperation with the vehicle motion main controller 104a.

In other words, the vehicle motion main controller 104a may receive first sensing information sensed by at least one of the V2X sensor, the GNSS sensor, and the inertial sensor and may control at least one of the ABS operation and the ESC operation, and the vehicle motion sub-controller 106a, upon determining that a network traffic occurs in the vehicle motion main controller 104a, may control at least one of the ABS operation and the ESC operation regarding a piece of first sensing information that causes an excessive load of the network traffic among the pieces of the first sensing information In addition, the vehicle motion main controller 104a may receive first sensing information sensed by at least one of the steering sensor, the pressure sensor for ESC, the ultrasonic sensor, the radar sensor, the LiDAR sensor, the BSD sensor, and the optical camera sensor and may control at least one of an ABS operation and ESC operation, and the vehicle motion sub-controller 106a, upon determining that a network traffic occurs in the vehicle motion main controller 104a, may control at least one of the ABS operation and the ESC operation regarding a piece of first sensing information that causes an excessive load of the network traffic among the pieces of the first sensing information.

Referring to FIGS. 3 and 4, the vehicle safety sub-controller 106b of the integrated ECU according to the embodiment of the present disclosure may be configured to, upon determining that a network traffic occurs in the vehicle safety main controller 104b, perform control on a piece of the second sensing information that causes an excessive load of the network traffic among pieces of the second sensing information in cooperation with the vehicle safety main controller 104b by receiving a second cooperative control signal corresponding to the piece of the second sensing information causing the excessive load of the network traffic from the vehicle safety main controller 104b.

For example, the vehicle safety sub-controller 106b, upon determining that a network traffic occurs in the vehicle safety main controller 104b, may receive a second cooperative control signal corresponding to a piece of second sensing information that causes an excessive load of the network traffic, among pieces of second sensing information from the vehicle safety main controller 104b, and may control at least one of a collision operation, an airbag operation, and a seatbelt wearing operation of the vehicle regarding the piece of second sensing information that causes the excessive load of the network traffic in cooperation with the vehicle safety main controller 104b.

In other words, the vehicle safety main controller 104b may receive second sensing information sensed by at least one of the collision sensor, the airbag sensor, and the seat belt sensor and may control at least one of the collision operation, the airbag operation, and the seat belt wearing operation of the vehicle, and the vehicle safety sub-controller 106b, upon determining that a network traffic occurs in the vehicle safety main controller 104b, may control at least one of the collision operation, the airbag operation, and the seat belt wearing operation of the vehicle regarding the piece of second sensing information that causes the excessive load of the network traffic.

Referring to FIG. 4, the vehicle driving sub-controller 106c of the integrated ECU 100 according the embodiment of the present disclosure may be configured to, upon determining that a network traffic occurs in the vehicle driving main controller 104c, perform control on a piece of the third sensing information that causes an excessive load of the network traffic among pieces of the third sensing information in cooperation with the vehicle driving main controller 104c by receiving a third cooperative control signal corresponding to the piece of the third sensing information causing the excessive load of the network traffic from the vehicle driving main controller 104c.

For example, the vehicle driving sub-controller 106c, upon determining that a network traffic occurs in the vehicle driving main controller 104c, receives a third cooperative control signal corresponding to a piece of third sensing information that causes an excessive load of the network traffic, among pieces of third sensing information from the vehicle driving main controller 104c, and control at least one of an ASC operation, a CDC operation, and an ARC operation regarding the piece of third sensing information that causes the excessive load of the network traffic in cooperation with the vehicle driving main controller 104c.

In other words, the vehicle driving main controller 104c may receive third sensing information sensed by at least one of the wheel speed sensor, the wheel acceleration sensor, the longitudinal acceleration sensor, and the lateral acceleration sensor and may control at least one of an ASC operation, a CDC operation, and an ARC operation, and the vehicle driving sub-controller 106c, upon determining that a network traffic occurs in the vehicle driving main controller 104c, may control at least one of the ASC operation, the CDC operation, and the ARC operation regarding a piece of third sensing information that causes an excessive load of the network traffic.

Although not shown in the drawings, the vehicle motion main controller 104a, the vehicle safety main controller 104b, the vehicle driving main controller 104c, the vehicle motion sub-controller 106a, the vehicle safety sub-controller 106b, and the vehicle driving sub-controller 106c may include at least one of a Bluetooth module (not shown), a Wi-Fi module (not shown), a Zigbee module (not shown), a Z-Wave module (not shown), a Wibro module (not shown), a Wi-Max module (not shown), a LTE module (not shown), an LTE Advanced module (not shown), a Li-Fi module (not shown), and a Beacon module (not shown), and perform a wireless communication with each other in consideration of the distortion rate and the transmission rate of communication signals.

As described above, the integrated ECU 100 according to the embodiment of the present disclosure includes the gateway 102, the vehicle motion main controller 104a, and the vehicle safety main controller 104b.

In addition, the integrated ECU 100 according to the embodiment of the present disclosure may further include the vehicle driving main controller 104c.

With the integrated ECU 100 according to the embodiment of the present disclosure, the vehicle motion main controller 104a, the vehicle safety main controller 104b, and the vehicle driving main controller 104c each having a respective domain perform control by receiving first sensing information, second sensing information, and third sensing information sensed by the vehicle motion sensor 30a, the vehicle safety sensor 30b, and the vehicle driving sensor 30c, respectively, using the gateway 102.

Accordingly, with the integrated ECU 100 according to the embodiment of the present disclosure, the vehicle motion main controller 104a, the vehicle safety main controller 104b, and the vehicle driving main controller 104c rapidly perform signal processing on the first sensing information, the second sensing information, and the third sensing information, thereby improving the response characteristics while improving the signal processing rate.

In addition, the integrated ECU 100 according to the embodiment of the present disclosure may further include the vehicle motion sub-controller 106a, the vehicle safety sub-controller 106b, and the vehicle driving sub-controller 104c.

Accordingly, the integrated ECU 100 according to the embodiment of the present disclosure may individual perform cooperative control on the first sensing information, the second sensing information, and the third sensing information desired to be controlled by the vehicle motion main controller 104a, the vehicle safety main controller 104b, and the vehicle driving main controller 104c, respectively.

With the integrated ECU 100 according to the embodiment of the present disclosure, the vehicle motion sub-controller 106a, the vehicle safety sub-controller 106b, and the vehicle driving sub-controller 104c may perform cooperative control on the first sensing information, the second sensing information, and the third sensing information and rapidly perform signal processing, thereby improving the signal processing rate and the response characteristics.

As is apparent from above, the integrated ECU according to the embodiments of the present disclosure can improve the response characteristics while improving the signal processing rate.

What is claimed is:

1. An integrated electronic control unit (ECU) comprising:
   a gateway configured to perform a network communication in connection with a network;
   a vehicle motion main controller having a domain corresponding to first sensing information sensed by a vehicle motion sensor of a vehicle such that the vehicle motion main controller performs control on a motion of the vehicle by receiving the first sensing information using the gateway;
   a vehicle safety main controller having a domain corresponding to second sensing information sensed by a vehicle safety sensor of the vehicle such that the vehicle safety main controller performs control on a safety of the vehicle by receiving the second sensing information using the gateway; and
   a vehicle motion sub-controller connected to the vehicle motion main controller, and configured to perform control on the first sensing information desired to be controlled by the vehicle motion main controller in cooperation with the vehicle motion main controller,
   wherein upon determining that a network traffic occurs in the vehicle motion main controller, the vehicle motion sub-controller is configured to perform control on the first sensing information desired to be controlled by the vehicle motion main controller in cooperation with the vehicle motion main controller by receiving a first cooperative control signal from the vehicle motion main controller.

2. The integrated ECU of claim 1, further comprising a vehicle driving main controller having a domain corresponding to third sensing information sensed by a vehicle driving sensor of the vehicle such that the vehicle driving main controller performs control on a driving of the vehicle by receiving the third sensing information using the gateway.

3. The integrated ECU of claim 1, further comprising a vehicle safety sub-controller connected to the vehicle safety main controller, and configured to perform control on the second sensing information desired to be controlled by the vehicle safety main controller in cooperation with the vehicle safety main controller.

4. The integrated ECU of claim 3, wherein upon determining that a network traffic occurs in the vehicle safety main controller, the vehicle safety sub-controller is configured to perform control on the second sensing information desired to be controlled by the vehicle safety main controller in cooperation with the vehicle safety main controller by receiving a second cooperative control signal from the vehicle safety main controller.

5. The integrated ECU of claim 3, wherein upon determining that a network traffic occurs in the vehicle safety main controller, the vehicle safety sub-controller is configured to perform control on a piece of the second sensing information that causes an excessive load of the network traffic among pieces of the second sensing information in cooperation with the vehicle safety main controller by receiving a second cooperative control signal corresponding to the piece of the second sensing information causing the excessive load of the network traffic from the vehicle safety main controller.

6. The integrated ECU of claim 2, further comprising a vehicle driving sub-controller connected to the vehicle driving main controller, and configured to perform control on the third sensing information desired to be controlled by the vehicle driving main controller in cooperation with the vehicle driving main controller.

7. The integrated ECU of claim 6, wherein upon determining that a network traffic occurs in the vehicle driving main controller, the vehicle driving sub-controller is configured to perform control on the third sensing information desired to be controlled by the vehicle driving main controller in cooperation with the vehicle driving main controller by receiving a third cooperative control signal from the vehicle driving main controller.

8. The integrated ECU of claim 6, wherein upon determining that a network traffic occurs in the vehicle driving main controller, the vehicle driving sub-controller is configured to perform control on a piece of the third sensing information that causes an excessive load of the network traffic among pieces of the third sensing information in cooperation with the vehicle driving main controller by receiving a third cooperative control signal corresponding to the piece of the third sensing information causing the excessive load of the network traffic from the vehicle driving main controller.

9. An integrated electronic control unit (ECU) comprising:
  a gateway configured to perform a network communication in connection with a network;
  a vehicle motion main controller having a domain corresponding to first sensing information sensed by a vehicle motion sensor of a vehicle such that the vehicle motion main controller performs control on a motion of the vehicle by receiving the first sensing information using the gateway;
  a vehicle safety main controller having a domain corresponding to second sensing information sensed by a vehicle safety sensor of the vehicle such that the vehicle safety main controller performs control on a safety of the vehicle by receiving the second sensing information using the gateway; and
  a vehicle motion sub-controller connected to the vehicle motion main controller, and configured to perform control on the first sensing information desired to be controlled by the vehicle motion main controller in cooperation with the vehicle motion main controller,
  wherein upon determining that a network traffic occurs in the vehicle motion main controller, the vehicle motion sub-controller is configured to perform control on a piece of the first sensing information that causes an excessive load of the network traffic among pieces of the first sensing information in cooperation with the vehicle motion main controller by receiving a first cooperative control signal corresponding to the piece of the first sensing information causing the excessive load of the network traffic from the vehicle motion main controller.

10. An integrated electronic control unit (ECU) comprising:
  a gateway configured to perform a network communication in connection with a network;
  a vehicle motion main controller having a domain corresponding to first sensing information sensed by a vehicle motion sensor of a vehicle such that the vehicle motion main controller performs control on a motion of the vehicle by receiving the first sensing information using the gateway;
  a vehicle safety main controller having a domain corresponding to second sensing information sensed by a vehicle safety sensor of the vehicle such that the vehicle safety main controller performs control on a safety of the vehicle by receiving the second sensing information using the gateway;
  a vehicle driving main controller having a domain corresponding to third sensing information sensed by a vehicle driving sensor of the vehicle such that the vehicle driving main controller performs control on a driving of the vehicle by receiving the third sensing information using the gateway; and
  a vehicle driving sub-controller connected to the vehicle driving main controller, and configured to perform control on the third sensing information desired to be controlled by the vehicle driving main controller in cooperation with the vehicle driving main controller.

11. The integrated ECU of claim 10, further comprising a vehicle motion sub-controller connected to the vehicle motion main controller, and configured to perform control on the first sensing information desired to be controlled by the vehicle motion main controller in cooperation with the vehicle motion main controller.

12. The integrated ECU of claim 10, further comprising a vehicle safety sub-controller connected to the vehicle safety main controller, and configured to perform control on the second sensing information desired to be controlled by the vehicle safety main controller in cooperation with the vehicle safety main controller.

13. The integrated ECU of claim 11, wherein upon determining that a network traffic occurs in the vehicle motion main controller, the vehicle motion sub-controller is configured to perform control on the first sensing information desired to be controlled by the vehicle motion main controller in cooperation with the vehicle motion main controller by receiving a first cooperative control signal from the vehicle motion main controller.

14. The integrated ECU of claim 11, wherein upon determining that a network traffic occurs in the vehicle motion main controller, the vehicle motion sub-controller is configured to perform control on a piece of the first sensing information that causes an excessive load of the network traffic among pieces of the first sensing information in cooperation with the vehicle motion main controller by receiving a first cooperative control signal corresponding to the piece of the first sensing information causing the excessive load of the network traffic from the vehicle motion main controller.

15. The integrated ECU of claim 12, wherein upon determining that a network traffic occurs in the vehicle safety main controller, the vehicle safety sub-controller is configured to perform control on the second sensing information desired to be controlled by the vehicle safety main controller in cooperation with the vehicle safety main controller by receiving a second cooperative control signal from the vehicle safety main controller.

16. The integrated ECU of claim 12, wherein upon determining that a network traffic occurs in the vehicle safety main controller, the vehicle safety sub-controller is configured to perform control on a piece of the second sensing information that causes an excessive load of the network traffic among pieces of the second sensing information in cooperation with the vehicle safety main controller by receiving a second cooperative control signal corresponding to the piece of the second sensing information causing the excessive load of the network traffic from the vehicle safety main controller.

17. The integrated ECU of claim 10, upon determining that a network traffic occurs in the vehicle driving main controller, the vehicle driving sub-controller is configured to perform control on the third sensing information desired to be controlled by the vehicle driving main controller in cooperation with the vehicle driving main controller by receiving a third cooperative control signal from the vehicle driving main controller.

18. The integrated ECU of claim 10, wherein upon determining that a network traffic occurs in the vehicle driving main controller, the vehicle driving sub-controller is configured to perform control on a piece of the third sensing information that causes an excessive load of the network traffic among pieces of the third sensing information in cooperation with the vehicle driving main controller by receiving a third cooperative control signal corresponding to the piece of the third sensing information causing the excessive load of the network traffic from the vehicle driving main controller.

* * * * *